UNITED STATES PATENT OFFICE.

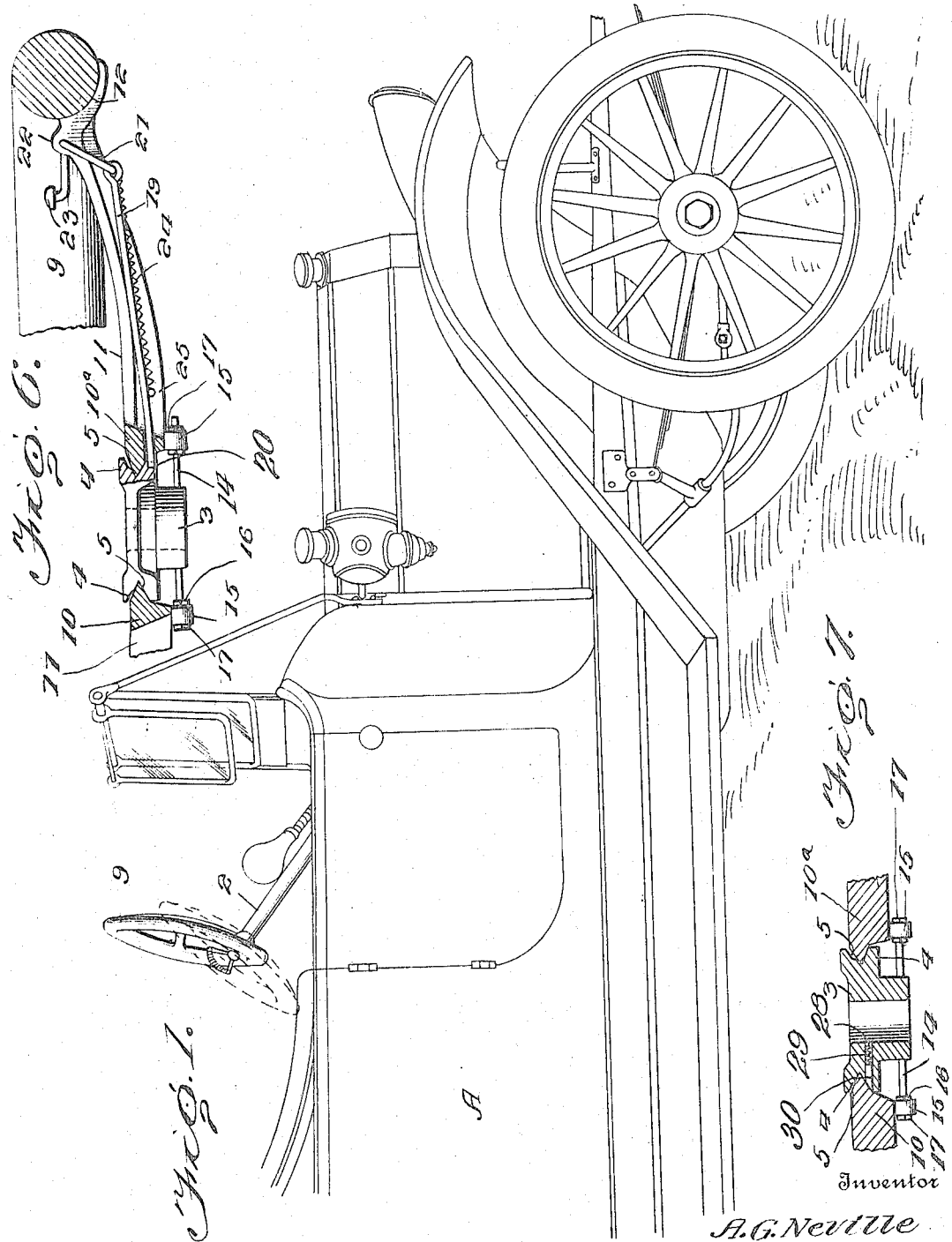

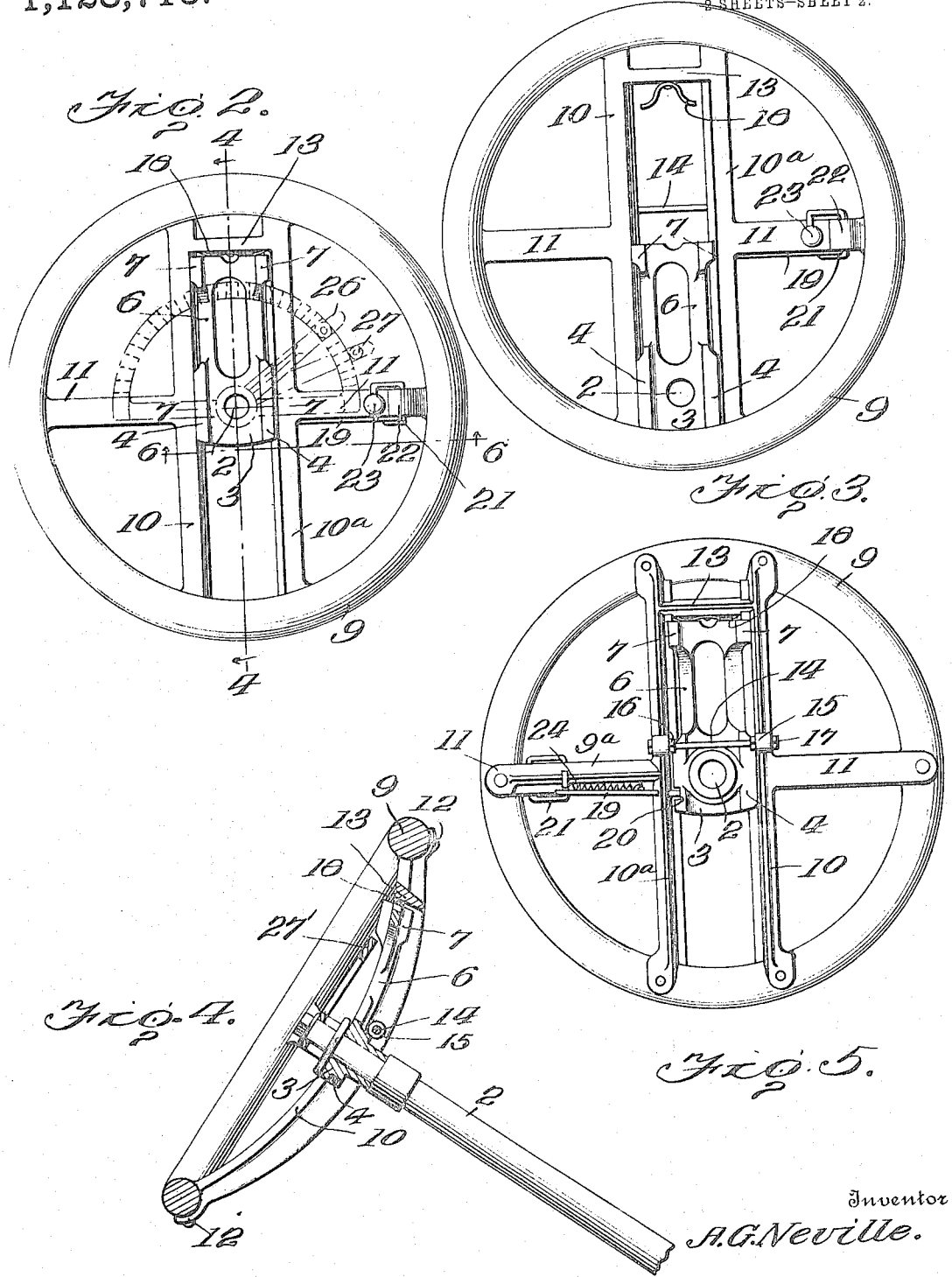

ASA G. NEVILLE, OF WELLSBURG, WEST VIRGINIA.

STEERING-WHEEL FOR AUTOMOBILES.

1,128,713.  Specification of Letters Patent.  Patented Feb. 16, 1915.

Application filed July 21, 1914. Serial No. 852,322.

*To all whom it may concern:*

Be it known that I, ASA G. NEVILLE, a citizen of the United States, residing at Wellsburg, in the county of Brooke and State of West Virginia, have invented certain new and useful Improvements in Steering-Wheels for Automobiles, of which the following is a specification.

My invention relates to automobiles, flying machines, motor-boats and like vehicles, and particularly to the steering posts and the steering wheels thereof.

In the ordinary arrangement of steering wheels the wheel is fixed upon the steering post or shaft to turn therewith and is held at all times concentric thereto. This position of the wheel impedes very greatly the movement of the driver into and out of the driver's seat.

It is the main object of my invention to obviate this inconvenience by so mounting the wheel on the post that while the wheel has at all times rotative engagement with the post, it has also a sliding engagement therewith so that the wheel may be shifted away from the driver's seat, thus increasing the space between the seat and the wheel and thus permitting the driver to have easier access to the seat.

A further object of the invention is to so construct the connection between the wheel and post that the usual spark and throttle controlling levers together with the rack therefor may be used.

A further object of the invention is to provide latching means whereby the wheel may be firmly engaged with the post and to provide a latching means which is disposed entirely within the lines of one of the cross-arms of the spider supporting the wheel.

A still further object of the invention is to provide means for preventing the rattling of the parts and in this connection to provide means whereby the parallel arms of the spider between which the sliding head operates, may be drawn together or spread apart to thus provide for an adjustment of these arms and provide for the taking up of any wear between the arms and the head, thus preventing rattling.

Other objects will appear in the course of the following description.

My invention is illustrated in the accompanying drawings, wherein:—

Figure 1 is a side elevation of an automobile with my improved steering wheel attached to the post thereof. Fig. 2 is a face view of the steering wheel. Fig. 3 is a like view to Fig. 2 but showing the steering wheel in a position eccentric to the steering post. Fig. 4 is a section on the line 4—4 of Fig. 2. Fig. 5 is an under side plan view of the spider and the steering wheel. Fig. 6 is an enlarged detail section on line 6—6 of Fig. 2. Fig. 7 is a detail section on line 7—7 of Fig. 2.

Corresponding and like parts are referred to in the following description and indicated in all the views of the accompanying drawings by the same reference characters.

Referring to these drawings, A designates an automobile of any suitable character and having the usual steering post 2. This steering post is provided at its upper end with a head 3 having integrally formed therewith the parallel longitudinally extending ribs 4 which are longitudinally grooved as at 5 for engagement with guides as will be later stated. The grooves 5 are preferably somewhat V-shaped in cross section, as illustrated clearly in Fig. 7. Extending forward from the head 3 adjacent its upper face is an integral web 6 which is preferably cut-away at its middle, the forward end of this web being provided on each side with the thickened portions or ribs 7, each of which is longitudinally grooved, the grooves being in alinement with the grooves 5.

The steering wheel comprises a rim 9 of any ordinary suitable construction and the spider which is attached to the rim includes the parallel transversely extending guides 10 and 10$^a$, the guides being substantially angular in cross section, as illustrated most clearly in Fig. 7 and extending diametrically across the entire steering wheel. Formed integral with these guides 10 and 10$^a$ are the arms 11, these arms being preferably triangular in cross section and extending at right angles to the guides and being attached at their extremities to the rim of the wheel. The extremities of the guides 10 and 10$^a$ and the arms 11 are curved to form seats 12 upon which the wheel rim 9 rests and to which the wheel rim is attached.

The arms 11 and the guides 10 and 10$^a$ together form a spider and are preferably formed integral with each other, although I do not wish to limit myself to this. At one end the guides are connected by a transverse web 13 angular in cross section and which crosses and forms one end of the space between the guides.

The head 3 is disposed between the guides 10 and 10ᵃ and the beveled inner edges of the guides extend into and engage with the grooves in the edges of the head and the web 6, as illustrated most clearly in Figs. 6 and 7. The guides 10 and 10ᵃ are downwardly and centrally curved as are the arms 11, and, as a consequence of these guides being slightly curved or concaved, the web 6 is slightly curved to correspond.

It will be seen that the head 3 with its extension 6 has sliding engagement between the guides for movement from a position of concentricity with the wheel rim to a position out of concentricity therewith. For the purpose of adjusting the guides nearer to or farther from each other, this adjustment being allowed by the resiliency of the guides and the fact that they are connected at only one end, I provide the transversely extending bolt 14 which is disposed preferably adjacent the transversely extending arms 11. This bolt is screw threaded at its ends and the ends of the bolt 6 pass through ears 15 formed on the under sides of the guides. Nuts 16 are provided for engagement with the inner faces of these ears and nuts 17 are provided for engagement with the outer faces of the ears. It will be obvious that by turning up these nuts in one direction or the other, the guides may be spread farther apart from each other or drawn nearer together. It will be obvious that when the guides are drawn nearer together they will more snugly fit the head 3 and that thus any wear between the head and the guides may be taken up and compensated for and the head prevented from rattling within the guides. A bowed spring 18 is preferably mounted upon the crossbar 13 and facing toward the head 3.

For the purpose of automatically locking the wheel in a position concentric to the steering post, I provide a spring actuated latching device 19, whose extremity passes through an opening in one of the guides 10ᵃ and is adapted to engage in a recess 20 in the head 3, as clearly illustrated in Figs. 5 and 6. The inner end of the latch may be beveled to more readily ride over the ends of the recess in operation. The outer end of the latching bolt 19 is engaged by the downwardly extending arm 21 of a thumb latch. This thumb latch is angularly bent and extends across the upper face of the arm 11 and through a bearing 22 formed upon this arm adjacent the extremity thereof and adjacent the rim 9. The extremity of the member 21 after it passes through the bearing 22 is bent inward toward the center of the wheel, it is then bent laterally and is there provided with a button 23.

A spring 24 is attached at its inner end to the arm 11 and at its outer end is attached to the inwardly turned lower extremity of the arm 21. The spring thereby acts to project the bolt 19 into the recess 20. By depressing the thumb-latch, however, the bolt is withdrawn against the force of the spring.

It will be noted that the arm 11 is not precisely triangular in form but is cut away, as at 25, for the actuation of the bolt 19 and of the spring 24 so that the bolt and spring practically operate within this cut-away portion and are disposed entirely within the lines of the arm. This arrangement protects the spring and bolt from accidental shock and adds very much to the appearance of the wheel. The bolt and spring are unseen from the face of the wheel. Furthermore, the housing of the spring within the cut away portion 25 prevents or tends to prevent the spring from becoming rusted from rain or dampness.

It will be noted from Figs. 2 and 3 that when the head is in its concentric position the extension 6 of the head will bear against and compress the spring 18 and act to take up any lost motion or slack in the head and act as an antirattler. In order to latch the head it is necessary to force the head up to its concentric position, thus compressing the spring 18 before the bolt will engage in the recess 20. I have thus provided two antirattler means, viz., the spring 18 with the bolt which prevents longitudinal movement of the head, and the bolt 14 which adjusts the space between the guides and thus prevents any rattling movement of the head between the guides.

Mounted upon the upper end of the steering post in any suitable manner are the usual levers 26 and 27, shown in dotted lines in Fig. 2, one controlling the spark and the other controlling the throttle. These levers connect with independent shafts which pass down through the center of the tubular steering post. The levers operate over an arcuate rack 27 as is usual in this class of devices.

It is particularly pointed out that the space between the guides is entirely open and that, therefore, a head may be used which will permit of the use of these levers.

The head is provided in one side with a recess or socket 28 in which is seated a spring 29 and a fiber block or shoe 30, the spring bearing upon the block and tending to eject the same. The block is thus held in frictional engagement with the adjacent guide so that the wheel will move steadily when being shifted and some wear will be automatically taken up.

The operation of my invention will be obvious from what has gone before.

Under normal conditions the wheel is disposed concentrically to the steering post and locked in this position by means of the latch. When the driver, however, desires to enter the vehicle or get out of the driver's seat, it is only necessary to release the latch by pressing upon the thumb-piece 23, whereupon the wheel may be shifted upward and outward to the position shown in Fig. 1, to increase the distance between the wheel and the driver's seat, thus permitting ready ingress to or egress from the seat. As soon as the driver has left the seat or entered it and releases the wheel, gravity will act to carry the wheel to its concentric position and the spring 18 will cushion the wheel against the jar incident to this return to concentricity. At the same moment the latch will spring into the recess 20 and lock the wheel when the wheel is exactly concentric. It will further be noted in this connection that as the guides 10 are slightly bowed, the lower margin of the rim of the wheel, when the wheel is shifted upward, will move not only upward but inward, thus gaining still more space between the seat and the lower margin of the wheel. In other words, the wheel moves in the arc of a circle. By placing the thumb-piece 23 adjacent the rim of the wheel, the necessity for the operator removing his hand from the rim of the wheel in order to shift the wheel is removed. It will be seen that there are no loose joints which are likely to rattle and that the guides 10 are securely braced by the transversely extending spider arms 11. It will also be noticed that the extension of the head forms a stop limiting the downward movement of the wheel under the action of gravity so that the wheel will be stopped at the point where the wheel is exactly concentric to the head and shaft.

Having thus described the invention what is claimed as new is:—

1. The combination with a shaft having a head thereon, of a steering wheel having spaced parallel guides between which the head is received and is movable, and means for adjusting the guides toward or from each other to take up wear.

2. The combination with a shaft having a head thereon, of a steering wheel having spaced parallel guides extending diametrically across the wheel between which the head is received for sliding movement, the space between said guides being unobstructed, an adjusting member extending between and connecting said guides, and means engaging the adjusting member whereby the guides may be adjusted toward or from each other.

3. The combination with a shaft having a head thereon, of a steering wheel having parallel guides with which the head has sliding engagement, whereby the wheel may be shifted from a concentric position to an eccentric position, an adjusting bolt extending transversely through said guides, and nuts engaging the bolt whereby the guides may be adjusted toward or from each other.

4. The combination with a shaft having a head thereon, of a steering wheel having spaced parallel downwardly bowed guides between which the head is received and with which it has sliding engagement, means for adjusting said guides toward and from each other, and means for locking the head in a concentrically adjusted position.

5. The combination with a shaft having a rectangular head thereon, of a steering wheel having spaced parallel guides between which the head is received and with which the head has sliding engagement, said head having a web extending therefrom on one side and at its extremity formed with laterally disposed portions slidingly engaging said guides, the head limiting the downward movement of the wheel with relation to the head to a position where the wheel is concentric to the head, and means for adjustably spacing said guides from each other.

6. The combination with a shaft having a head thereon, of a steering wheel having oppositely disposed parallel guides, said guides being connected to each other at one end by a transverse web, and means for adjusting said guides toward or from each other.

7. The combination with a shaft having a head thereon, of a steering wheel including a spider having spaced parallel guides between which the head is received and with which it has sliding engagement, said wheel being thereby shiftable from a position concentric to the shaft to a position eccentric to the shaft, manually operable means for locking the wheel in a position concentric to the shaft, and a bolt connecting the guides below the path of movement of the head whereby the guides may be adjusted toward or from each other.

8. The combination with a shaft having a head, the lateral edges of the head being formed with guide grooves, of a steering wheel having spaced parallel guides, the inner edges of the said guides being adapted to engage in said grooves, each of said guides having downwardly extending reinforcing flanges, and a bolt passing transversely through said last-named flanges, and nuts on the bolt whereby the guides may be adjusted toward or from each other.

9. The combination with a shaft having a rectangular head thereon, and having a web extending therefrom on one side, of a steering wheel having spaced parallel guides between which the head is received and with which it has sliding engagement, the said web limiting the downward movement of the wheel with relation to the head to a position where the wheel is concentric to the head, downwardly extending flanges on the guides, and a bolt passing through said flanges and below the path of movement of the web, and nuts engaging the bolt whereby the guides may be adjusted toward or from each other.

10. The combination with a shaft, having a rectangular head thereon, the head being formed on the side edges with longitudinally extending guide grooves, the head having a web extending from one side, the end of the web being provided with laterally disposed guide grooves, a steering wheel having a supporting spider, said spider including oppositely disposed parallel guide members, each of said guide members being approximately triangular in cross section and having guiding ribs upon its inner face engaging with the guide grooves of the head and extension, arms extending laterally from the said guide members and engaging the wheel, one of said arms being cut-away on its inner face, a bolt disposed in said cut-away portion and extending through an opening in the adjacent guide member and normally engaging a recess in the head, a spring for projecting the bolt, a finger-piece whereby the bolt may be retracted, and means for adjusting the guide members toward or from each other.

11. The combination with a steering post, a head thereon, a hand-wheel comprising a spider and rim, the spider embodying a diametrical guide slidingly engaging the head and connecting the hand-wheel with the steering post to turn therewith, and laterally extending arms, a latch mounted on the guide, adjacent the inner end of one of the laterally extending arms, thumb latch mounted on the outer end of the last mentioned lateral arm adjacent the rim of the wheel, and a connection between the two latches located directly beneath the lateral arm and protected thereby.

12. The combination with a steering post, a head thereon, a hand-wheel comprising a spider and rim, the spider embodying a diametrical guide slidingly engaging the head and connecting the hand-wheel with the steering post to turn therewith, and laterally extending arms, one of such arms having a lower longitudinal side portion cut away, a latch mounted upon the guide adjacent the inner end of the cut away lateral arm, a thumb latch mounted on the outer end of the cut away lateral arm adjacent the rim of the wheel, connecting means between the two latches arranged in the longitudinal cut away portion of the lateral arm, and a spring paralleling the connecting means and exerting an inward pull thereon and arranged in the cut away part of the lateral arm and housed thereby.

In testimony whereof I affix my signature in presence of two witnesses.

ASA G. NEVILLE. [L. S.]

Witnesses:
 FRANK MUTCHLER,
 PERRY J. BIGHAM.